United States Patent [19]

Coleman

[11] Patent Number: 4,886,091

[45] Date of Patent: Dec. 12, 1989

[54] ANTI-SHOCK DIRECTIONAL CONTROL FLUID VALVE

[75] Inventor: Lawrence B. Coleman, Bloomington, Minn.

[73] Assignee: Continental Machines, Inc., Savage, Minn.

[21] Appl. No.: 208,656

[22] Filed: Jun. 20, 1988

[51] Int. Cl.[4] ..................... F15B 13/044; F16K 31/06

[52] U.S. Cl. ................................ 137/625.65; 251/50; 251/77; 251/129.1; 251/129.19

[58] Field of Search ..................... 137/625.65; 251/50, 251/80, 129.1, 129.19, 77

[56] References Cited

U.S. PATENT DOCUMENTS

| | | | |
|---|---|---|---|
| 2,619,121 | 11/1952 | Renick | 251/77 |
| 2,916,019 | 12/1959 | Murphy | 137/625.65 |
| 3,229,721 | 1/1966 | Bingel | 251/80 X |
| 3,397,717 | 8/1968 | Tenkku et al. | 251/77 X |
| 3,527,253 | 9/1970 | Harpman | 137/625.65 X |
| 3,756,282 | 9/1973 | Knutson | 137/625.65 X |
| 3,799,203 | 3/1974 | Doutt | 137/625.65 |
| 3,896,856 | 7/1975 | Schumacher et al. | 137/625.65 |
| 3,967,648 | 7/1976 | Tirelli | 137/625.65 |
| 4,176,687 | 12/1979 | Ensign | 137/625.65 |
| 4,611,631 | 9/1986 | Kosugi et al. | 137/625.65 |
| 4,616,675 | 10/1986 | Amrhein | 137/625.65 |

FOREIGN PATENT DOCUMENTS

| | | | |
|---|---|---|---|
| 1812854 | 12/1969 | Fed. Rep. of Germany | 251/129.1 |

*Primary Examiner*—Gerald A. Michalsky
*Attorney, Agent, or Firm*—Dean A. Monco

[57] ABSTRACT

A valve driving apparatus for impartation of a motive force to a valve component which employs a flexible drive member intermediate the actuator member and the valve component to be moved. The flexible drive member is capable of storing energy momentarily so that the speed of movement of the actuator member and the speed of movement of the valve component may be different, preferably with the motion of the valve component being slower than the motion of the actuator member. In the preferred embodiment, the actuator member, flexible drive member, and valve component operate substantially on a common axis.

12 Claims, 4 Drawing Sheets

70

ANTI-SHOCK DIRECTIONAL CONTROL FLUID VALVE

BACKGROUND OF THE INVENTION

The present invention is directed to directional control fluid valves such as those used in controlling hydraulic and other fluid systems. Specifically, the present invention relates to an improvement in such a directional control fluid valve which enables the actuation of valve spool movement within the valve in a manner to reduce pressure surges and shocks in the hydraulic systems associated with the valve while effecting actuation with fast acting actuators, such as alternating current (AC) solenoids.

The invention relates to a flexible drive member interposed between the spool of the valve to be moved and the actuating mechanism, which flexible drive member is capable of storing energy and thereby allows the spool to move at a different rate than the actuator applies motor force to the spool.

A problem experienced by hydraulic and other fluid systems is the creation of surges and shocks in a system during its operation because the control valve produces too fast an action. This problem has been recognized and addressed in the prior art. For example, in U.S. Pat. No. 3,324,890 to Witmore, et al., a dash pot is used which has a particular physical configuration to effect damping or retardation of motion of the valve element during specific portions of its travel. The Witmore device specifically is designed to not impede motion of the valve element in other portions of its travel.

Direct current (DC) solenoids have been used for actuation of directional control fluid valves in which slow spool movement is desirable because the armature of a DC solenoid can be shifted slowly, or even held in a position to keep the valve partially opened, without damage to the solenoid. However, if an AC solenoid is energized and the armature does not shift completely against the armature stop in a very short time (usually in less than 24 milliseconds), severe overheating and short circuiting of the solenoid coil will occur.

Since slow spool movement times of 50 milliseconds to 1000 milliseconds are common for antishock directional control fluid valves, AC solenoids have heretofore not been used to actuate such valves, even though the cost of AC solenoids is significantly less than the cost of comparably capable DC solenoids.

The flexible drive pin of the present invention allows an AC solenoid armature to complete its travel to the armature stop in its normal operating time without damage to the solenoid. The flexible drive pin stores energy during the travel of the solenoid armature and relatively slowly dissipates that stored energy to move the valve spool more slowly than the solenoid armature moved, thereby effecting an appropriate speed of movement of the valve spool to accomplish antishock actuation of the control valve while still enjoyinq the economic benefit of a significantly cheaper AC solenoid component.

SUMMARY OF THE INVENTION

The invention is a valve driving apparatus for impartation of a motive force to a valve component which employs a flexible drive member intermediate the actuator member and the valve component to be moved. The flexible drive member is capable of storing energy momentarily so that the speed of movement of the actuator member and the speed of movement of the valve component may be different, preferably with the motion of the valve component being slower than the motion of the actuator member. In the preferred embodiment, the actuator member, flexible drive member, and valve component operate substantially on a common axis.

It is therefore an object of this invention to provide an apparatus by which a valve component may be moved by an actuator member with the motion of the valve component occurring at a slower rate than the motion of the actuator member occurs.

A further object of this invention is to provide an actuating apparatus for a directional control fluid valve with which AC solenoids may be used to effect actuation of valve members without creating shock or surges in the fluid system associated with the valve.

Further objects and features of the present invention will be apparent from the following specification and claims when considered in connection with the accompanying drawings illustrated in the preferred embodiment of the invention.

DETAILED DESCRIPTION OF THE DRAWINGS

DETAILED DESCRIPTION OF THE INVENTION

Figure 1:
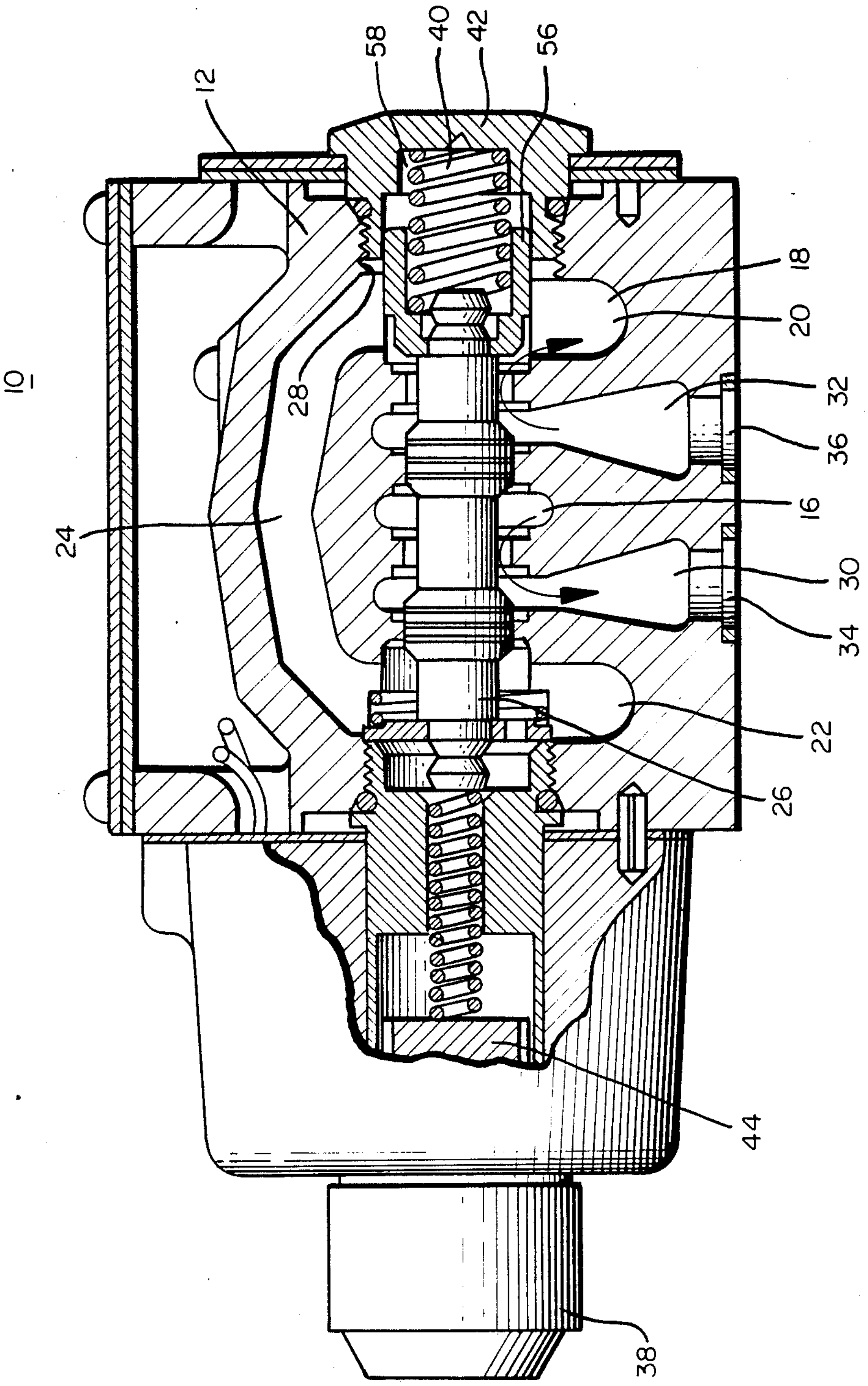
FIG. 1 is a partial section view of a direct operated, single solenoid, two position, spring offset, four way directional control valve illustrative of the preferred embodiment of the present invention in a non-actuated position.

Referring to FIG. 1, a partial section view of a direct operated, single solenoid, two position, spring offset, four way directional control valve 10 is illustrated. The valve 10 comprises a valve body 12 within which are several internal chambers. A fluid inlet chamber 16 is connected to a hydraulic pump through a port (not shown) so that a hydraulic pump can supply fluid to the system (not shown) to be controlled by the valve 10 by the pumping of hydraulic fluid through the inlet port to the fluid inlet chamber 16. The valve 10 effects directional control of the hydraulic fluid in a manner which will be described hereinafter.

Also contained within the valve body 12 are two circuit chambers 30 and 32 which are in communication with the hydraulic circuit (not shown) which is controlled by the valve 10. The circuit chamber 30 communicates with the hydraulic circuit through circuit port 34 and the circuit chamber 32 communicates with the hydraulic circuit through circuit port 36.

The valve body 12 also contains a tank chamber 18 which communicates through a port (not shown) to a reservoir (not shown) associated with the fluid system controlled by the valve 10. The tank chamber 18 is comprised of two lobes 20 and 22. The two lobes 20, 22 are in communication with each other through an internal passage 24 within the valve body 12. A valve spool 26 is disposed within a multi-diameter internal channel 28 in the valve body 12 and is slideably movable within the internal channel 28 to selectively allow or prevent communication between selected internal chambers 16, 18, 30, 32 within the valve body 12.

A solenoid 38 is located to the left of the valve spool 26 in FIG. 1. An offset spring 40 is located at the end of the valve spool 26 distal from the solenoid 38. The offset spring 40 is compressible between the valve spool 26 and an end cap 42.

With the solenoid 38 de-energized and the valve 10, therefore, not actuated, the valve spool 26 is held in its at-rest position (as shown in FIG. 1) which allows communication between fluid inlet chamber 16 and circuit chamber 30 and allows communication between circuit chamber 32 and lobe 20 of tank chamber 18. Thus, the hydraulic circuit (not shown) controlled by the valve 10 has hydraulic fluid flow applied to it via circuit port 34. Return fluid from the hydraulic circuit passes to the reservoir (not shown) through circuit port 36 and tank chamber 18.

For the purpose of ease of understanding of the invention, like elements will be identified by like numerals in the various figures.

Figure 2:
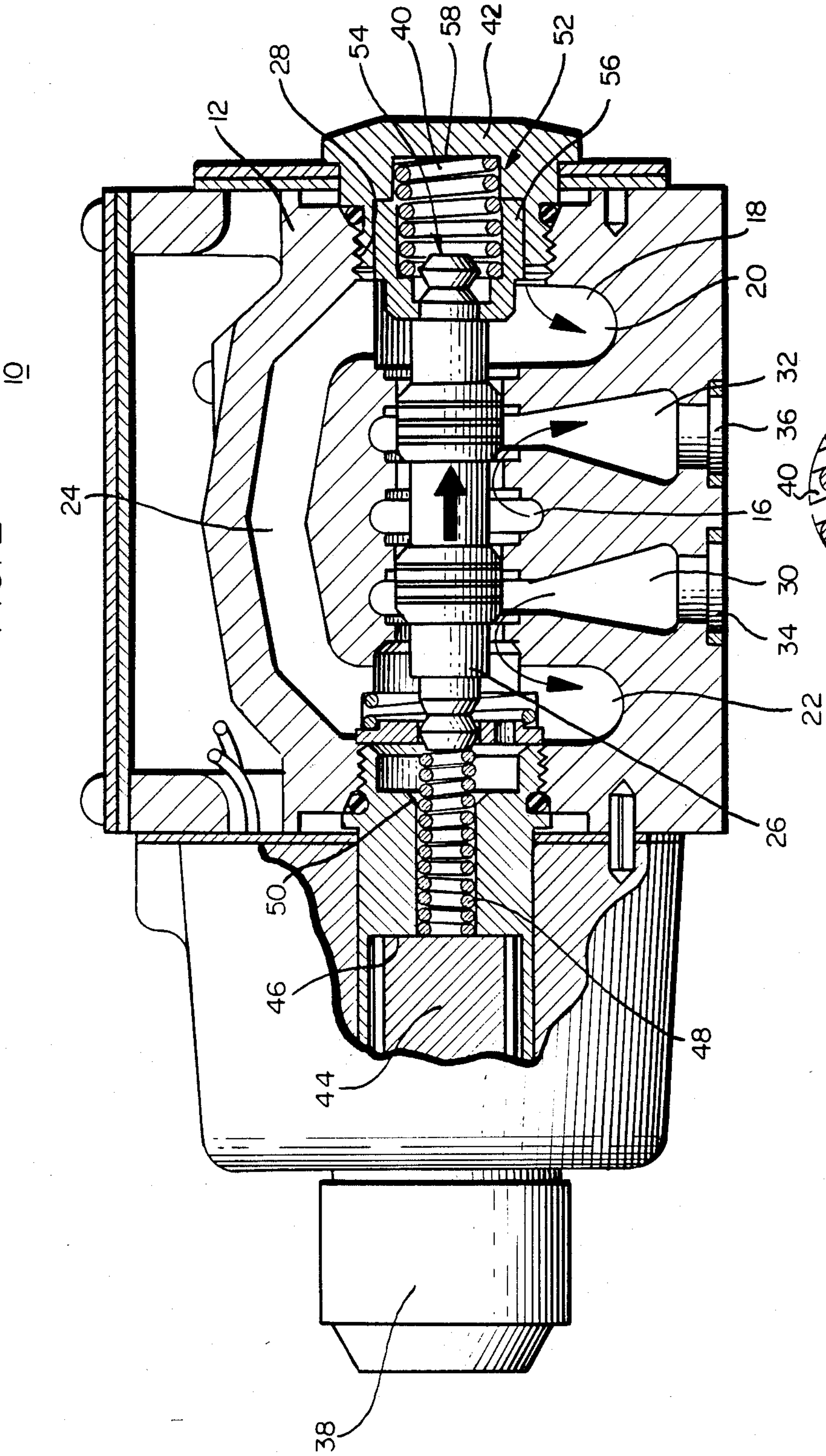
FIG. 2 is a partial section view of the valve illustrated in FIG. 1 in an actuated position.

Referring to FIG. 2, the valve 10 is shown in its actuated position. In FIG. 2, the armature 44 of the solenoid 38 has been moved to the right against armature stop 46 upon the occasion of the actuation of solenoid 38. Such movement of the armature 44 compresses flexible drive member 48. The speed of movement of armature 44 is sufficiently fast that the flexible drive member 48 is substantially, but not fully, compressed when the armature 44 reaches the armature stop 46. Further, when the armature 44 reaches the armature stop 46, the valve spool 26 has substantially remained stationary. Thus, the flexible drive member 48 stores the energy imparted thereto by the armature 44. Subsequently, the flexible drive member 48 expands rightward (in FIGS. 1 and 2) against the valve spool 26, thereby applying a force to the end 50 of the valve spool 26. As a result, the valve spool 26 moves to the right in FIG. 2, compressing offset spring 40 against end cap 42, which is threadedly received within the internal channel 28. By such movement, the valve spool 26 effects selected masking and unmasking of the internal chambers 16, 18, 30, 32 within the valve body 12 to permit communication from the fluid inlet chamber 16 to circuit chamber 32 and from circuit chamber 30 to lobe 22 of tank chamber 18.

The flexible drive member 48, in the preferred embodiment of the present invention, is a helical compression spring having a spring force appropriate to effect movement of the valve spool 26 at a slower speed than the armature 44 moves.

To further ensure that the valve spool 26 moves more slowly than the armature 44 moves, the movement of the valve spool 26 is damped by a dashpot assembly 52 associated with the distal end 54 of the valve spool 26. The dashpot assembly 52 is comprised of a cup member 56 affixed to the distal end 54 of the valve spool 26 and is in closely toleranced sliding relationship with the end cap 42.

The offset spring 40 is nested within the cup member 56. The cup member 56, in cooperation with the end cap 42, defines a dashpot chamber 58 within which the offset spring 40 is disposed. In the at-rest position of the valve 10 (see FIG. 1), the dashpot chamber 58 is filled with fluid. Upon actuation of the solenoid 38, the armature 44 responsively moves to the right, which compresses the flexible drive member 48. As previously described, the valve spool 26 responds to the subsequent release of energy stored within the flexible drive member 48 to compress the offset spring 40 and hydraulic fluid within the dashpot chamber 58 is compressed. The hydraulic fluid escapes from the dashpot chamber 58 through a space intermediate the cup member 56 and the interior of the internal channel 28.

Figure 3:
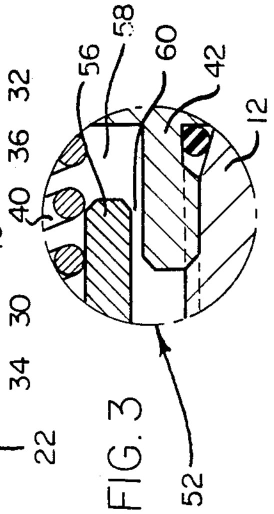
FIG. 3 is a detailed section view of a portion of the valve illustrated in FIG. 2.

FIG. 3 illustrates the structure which allows this interaction of the cup member 56, the hydraulic fluid in the dashpot chamber 58, and the end cap 42 in greater detail. In FIG. 3, the cup member 56 is shown in slightly spaced relation with the end cap 42 within the valve body 12. The spaced relation is established by the cup member 56 being of a smaller diameter than the internal diameter of the end cap 42, thereby providing a gap 60 through which the hydraulic fluid in the dashpot chamber 58 may escape during movement of the valve spindle 26 to the right in FIG. 2 upon actuation of the solenoid 38, as hereinbefore described. The span of the gap 60 determines the amount of damping action provided by the dashpot assembly 52; a larger gap 60 results in less damping and a smaller gap 60 results in greater damping.

The flexible drive member 48 is preferably in the shape of a helical compression spring and is of a size that provides the flexible drive member 48 is not fully compressed when the armature 44 is fully against the armature stop 46 and the valve spool 26 is in its non-actuated position. Further, in the preferred embodiment of the present invention, there should be a balance of spring forces between the flexible drive member 48 and the offset spring 40. Thus, in the preferred embodiment of the present invention, the spring force of the flexible drive member 48, with the armature 44 fully against the armature stop 46 and the valve spool 26 still in the non-actuated position, is preferably less than 90% of the force of the solenoid 38 at quiet hold position with the armature 44 against the armature stop 46. Moreover, after full travel of the valve spool 26 to the right (see FIG. 2), the spring force of the flexible drive member 48 should be a minimum of 10% greater than the spring force of the offset spring 40.

De-energizing the solenoid 38 results in the armature 44 moving away from the armature stop 46 to the position indicated in FIG. 1, which movement results from the force provided by the flexible drive member 48 operating against the armature 44. The valve spool 26 will thereupon begin movement toward the solenoid 38 because of the force provided by the offset spring 40 expanding between the distal end 54 of the valve spool 26 and the end cap 42. Hydraulic fluid will then be drawn back in to the dashpot chamber 58 through the gap 60 between the cup member 56 and the end cap 42. The valve spool 26 will return to the position illustrated in FIG. 1 and re-establish the flow patterns described hereinbefore in connection with that drawing.

Figure 4:
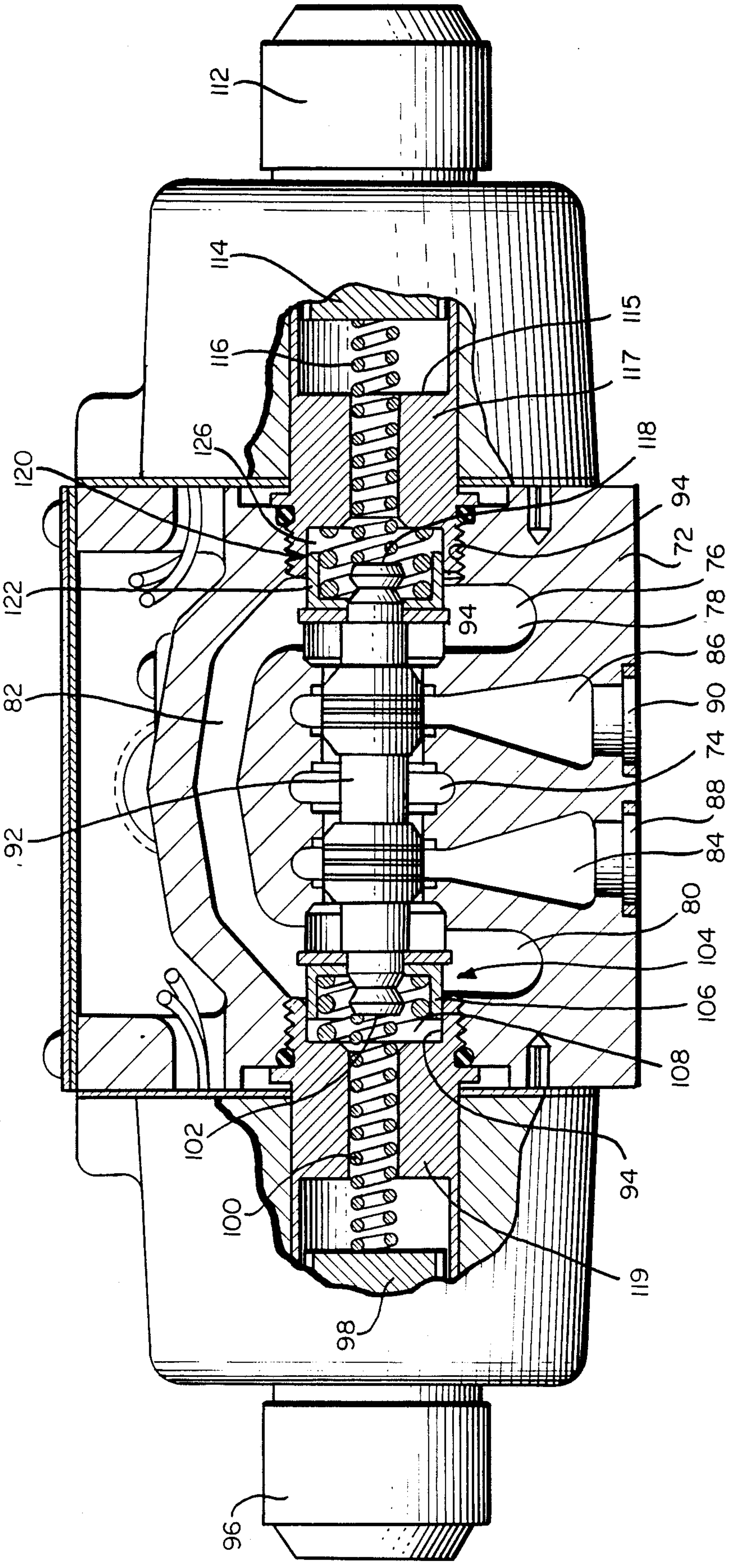
FIG. 4 is a partial section view of a direct operated, double solenoid, three position, spring centered, four way directional valve in a non-actuated position illustrating an alternate embodiment of the present invention.

Referring to FIG. 4, a partial section view of a direct operated, double solenoid, three position, spring centered, four way directional valve 70 in its non-actuated position is illustrated. The valve 70 is comprised of a valve body 72 containing therein a plurality of chambers. A fluid inlet chamber 74 communicates through a fluid inlet port (not shown) from a hydraulic pump to a hydraulic circuit (not shown) in which the valve 70 is used to control the flow of hydraulic fluid. Also contained within the valve body 72 is a tank chamber 76 having two lobes 78 and 80 which communicate through an internal passage 82. The tank chamber 76 communicates with a reservoir (not shown) through a reservoir port (not shown). Further contained within the valve body 72 are circuit chambers 84 and 86 which communicate with the hydraulic circuit (not shown) controlled by the valve 70 through circuit ports 88 and 90.

A valve spool 92 is slidably disposed within the valve body 72 within a multi-diameter internal channel 94.

At the left end of the valve 70 in FIG. 4 is a solenoid 96 having an armature 98. A flexible drive member 100 is disposed between the armature 98 and a first end 102 of valve spool 92. A dashpot assembly 104 is affixed to the first end 102 of the valve spool 92. The dashpot assembly 104 is comprised of a cup member 106 which is attached to the valve spool 92 and 20 slidably disposed within a service cap 119 which is threadedly received within the internal channel 94. The service cap 117 presents appropriate structure to accommodate an armature 114 associated with a second solenoid 112, its related second flexible drive member 116, and an armature stop 115. A sufficient gap is provided between the cup member 106 and the service cap 119 to allow escape of hydraulic fluid contained within the dashpot chamber 108 in a manner similar to the construction described in connection with FIG. 3 above.

At the right end of the valve 70 in FIG. 4 is the second solenoid 112 with its armature 114. The second flexible drive member 116 is disposed within the service cap 117 between the armature 114 and a second end 118 of the valve spool 92. A second dashpot assembly 120 is attached at the second end 11 of the valve spool 92 and comprises a cup member 122 slidably disposed within a second service cap 117 which defines a dashpot chamber 126. Sufficient clearance exists betWeen the cup member 122 and the service cap 117 to allow hydraulic fluid within the dashpot chamber 126 to escape in a manner similar to that described in connection with FIG. 3 above.

The valve 70 illustrated in FIG. 4 is in an at-rest position with neither solenoid 96 nor solenoid 112 actuated. In this at-rest position, none of the chambers 74, 76, 84, 86 communicates with any other chamber.

Figure 5:
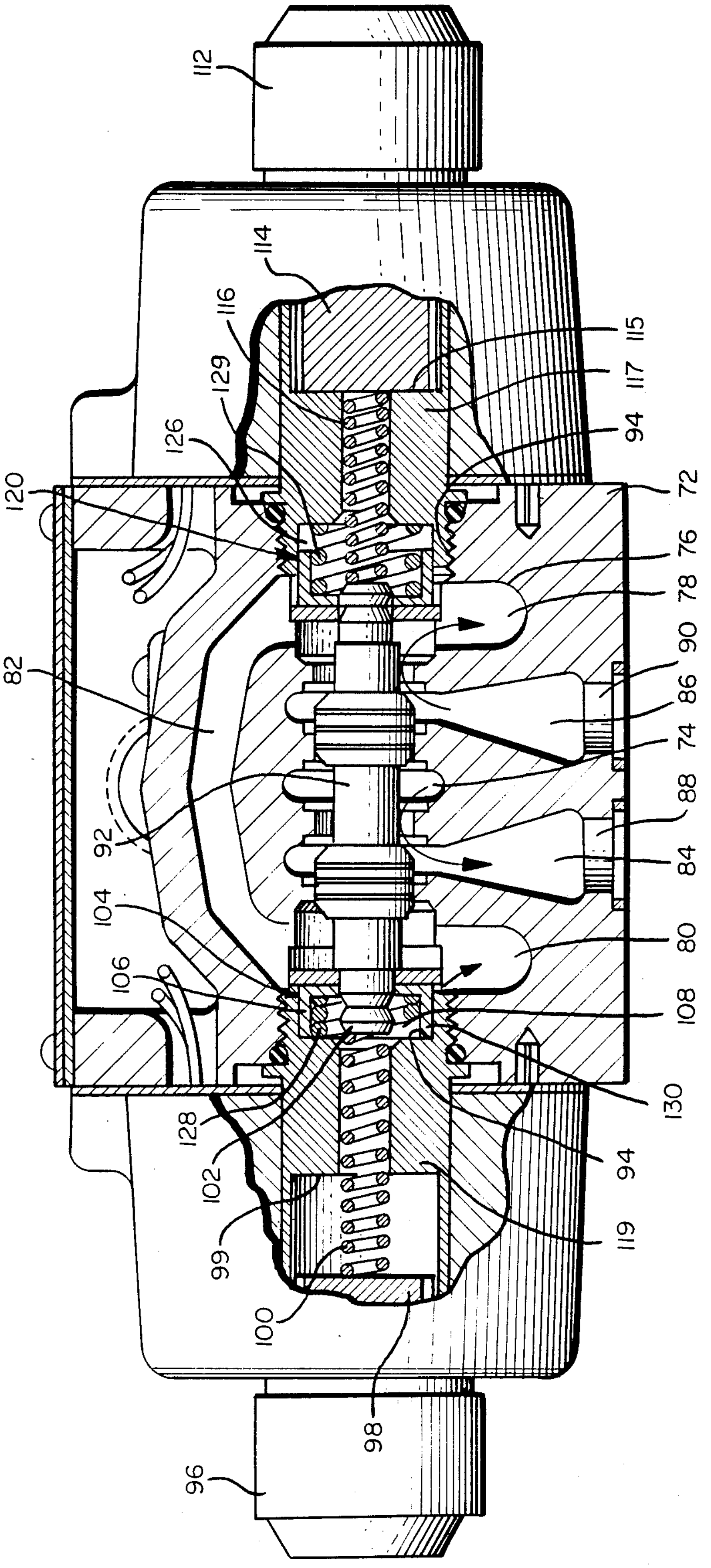
FIG. 5 is a partial section view of the valve illustrated in FIG. 4 in one of its actuated positions.

Referring to FIG. 5, the valve which was illustrated in FIG. 4 is shown in a position resulting from actuation of solenoid 112. In response to the actuation of solenoid 112, the armature 114 moves to the left in FIG. 5 against armature stop 115, compressing the flexible drive member 116. The speed of movement of armature 114 is appropriate to substantially, but not fully, compress flexible drive member 116 when the armature 114 is against the armature stop 115. The valve spool 92 remains substantially at rest during compression of the flexible drive member 116 by the armature 114. Thus, flexible drive member 116 stores the energy imparted thereto by the armature 114. The energy stored within the flexible drive member 116 is subsequently released and urges the valve spool 92 to the left (in FIG. 5), thereby allowing communication and fluid flow from circuit chamber 86 to tank chamber 76 and from fluid inlet chamber 74 to circuit chamber 84. In its movement to the left in FIG. 5, the valve spool 92 compresses a centering spring 128 which is disposed within the dashpot chamber 108 and nested within the cup member 106 and partially compresses flexible drive member 100. The centering spring 128 is compressed by the leftward movement of valve spool 92 in FIG. 5 against a wall 130.

Movement of the valve spool 92 in response to actuation of the solenoid 112 is slower than the movement of armature 114 because the spring force of the flexible drive member 116 is appropriately selected, and because of damping provided by dashpot assembly 104. Leftward movement of valve spool 92 in FIG. 5 compresses fluid within the dashpot chamber 108. The fluid thus compressed escapes from the dashpot chamber 108 through a gap between cup member 106 and the wall of internal channel 94 in a manner described above in connection with FIG. 3.

A balancing of spring forces is important in the design and operation of the embodiment of the present invention illustrated in FIGS. 4 and 5. In this alternate embodiment, the flexible drive member 116 should have a spring force of less than 90% of the quiet hold force of solenoid 112 when the armature 114 is against armature stop 115. Moreover, the spring force of the flexible drive member 116, after full travel of the valve spool 92 in response to actuation of solenoid 112, should be a minimum of 10% greater than the combined spring forces of the fully compressed centering spring 128 and the partially compressed flexible drive member 100.

Deactuation of solenoid 112 results in rightward movement of the armature 114 in FIG. 5 in response to the force imparted by flexible drive member 116 against the valve spool 92 and against armature 114. The centering spring 128 then moves the valve spool 92 to the right (in FIG. 5). A second centering spring 129 serves to balance the return stroke of valve spool 92 in its at-rest position (see FIG. 4) since the second centering spring has a spring force substantially the same as centering spring 128.

Actuation of the solenoid 96 results in a "mirror image" operation of the valve 70 in FIGS. 4 and 5 to move the armature 98 to the armature stop 99 and against the flexible drive member 100, compressing flexible drive member 100. Subsequently, flexible drive member 100 expands, thereby imparting force to the end 102 of the valve spool 92, moving the valve spool 92 rightward in FIG. 5 to compress the second centering spring 129 within the dashpot chamber 126 and partially compressing flexible drive member 116. Such movement of the valve spool 92 results in allowing communication from the fluid inlet chamber 74 to circuit chamber 86 and from circuit chamber 84 to lobe 80 of the tank chamber 72.

It is to be understood that, while the detailed drawings and specific examples given describe preferred embodiments of the invention, they are for the purpose of illustration only, but the apparatus of the invention is not limited to the precise details and conditions disclosed and that various changes may be made therein without departing from the spirit of the invention which is defined by the following claims.

I claim:

1. An improved anti-shock directional control fluid valve having a plurality of fluid ports, movable spool means for selectively allowing or denying fluid communication between selected of said fluid ports, and actuator means for imparting a motive force over a predetermined displacement to said spool means; the improvement comprising damping means for providing a retarding effect to displacement of said spool means, said retarding effect varying directly with said motive force, and a flexible drive means for communicating said motive force between said actuator means and said spool means; said flexible drive means being capable of momentarily storing energy to enable said spool means to move at a different rate than the rate at which said actuator means imparts said motive force, said flexible drive means being configured to preclude completion of travel of said spool means before said actuator means transverse said predetermined displacement, and said spool means moving in response to a resultant force at a speed appropriate to avoid hydraulic shock, said resultant force being substantially established by the difference between said motive force and said retarding effect.

2. An improved anti-shock directional control fluid valve as recited in claim 1 wherein said spool means, said actuator means, and said flexible drive means move substantially on a common axis.

3. An improved anti-shock directional control fluid valve as recited in claim 2 wherein said flexible drive means comprises a helical spring.

4. An improved anti-shock directional control fluid valve as recited in claim 1 wherein said flexible drive means comprises a helical spring.

5. An anti-shock valve driving apparatus for imparting a resultant force to a valve component to displace said valve component at a speed appropriate to avoid hydraulic shock, the apparatus comprising an actuator means for providing a motive force over a predetermined distance to said valve component, a flexible drive means for communicating said motive force to said valve component, and a damping means for providing a retarding effect to displacement of said valve component, said retarding effect varying directly with said motive force; said flexible drive means being capable of momentarily storing energy to enable application of said motive force to said valve component at a different rate than the rate at which said actuator means imparts said motive force, said flexible drive means being configured to preclude completion of travel of said valve component before said actuator means transverses said predetermined distance and said resultant force being substantially established by the difference between said motive force and said retarding effect.

6. A valve driving apparatus for impairing a resultant force to a valve component as recited in claim 5 wherein said valve component, said actuator means, and said flexible drive means move substantially on a common axis.

7. A valve driving apparatus for imparting a resultant force to a valve component as recited in claim 6 wherein said flexible drive means comprises a helical spring.

8. A valve driving apparatus for imparting a resultant force to a valve component as recited in claim 5 wherein said flexible drive means comprises a helical spring.

9. An anti-shock valve driving apparatus for imparting a resultant force to a valve component to move said valve component from a first position to a second position at a speed appropriate to avoid hydraulic shock, the apparatus comprising an actuator means for providing a motive force over a predetermined distance to said valve component, a flexible drive means for communicating said motive force to said valve component, a damping means for providing a retarding effect to displacement of said valve component, said retarding effect varying directly with said motive force, and bias means for biasing said valve component toward said first position; said flexible drive means being capable of momentarily storing energy to enable application of said motive force to said valve component at a slower rate than the rate at which said actuator means imparts said motive force, said resultant force being substantially established by the difference between said motive force and said retarding effect, the apparatus being configured to impart sufficient of said resultant force to said valve component to overcome said bias means while precluding completion of travel of said valve component before said actuator means traverses said predetermined distance.

10. A valve driving apparatus for imparting a resultant force to a value component as recited in claim 9 wherein said valve component, said actuator means, and said flexible drive means move substantially on a common axis.

11. A valve driving apparatus for imparting a resultant force to a valve component as recited in claim 10 wherein said flexible drive means comprises a helical spring.

12. A valve driving apparatus for imparting a resultant force to a value component as recited in claim 9 wherein said flexible drive means comprises a helical spring.

* * * * *